United States Patent Office 3,154,556
Patented Oct. 27, 1964

3,154,556
N-PYRIDYLETHYL-2:3-POLYMETHYLENE-INDOLES
Meier E. Freed, Philadelphia, Pa., and Leonard M. Rice, Minneapolis, Minn., assignors to American Home Products Corporation, New York, N.Y., a corporation of Delaware
No Drawing. Filed Dec. 4, 1962, Ser. No. 242,085
10 Claims. (Cl. 260—296)

This invention relates to substituted polymethyleneindoles. More particularly this invention relates to new pyridylalkyl polymethylene indoles and to the methods by which they are prepared.

The new compounds of the present invention are characterized by the following general formula

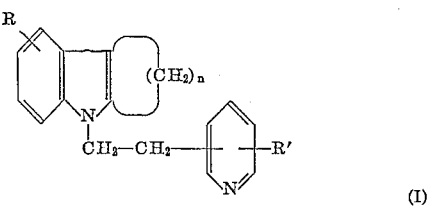

where $n$ is an integer from 5 to 13 inclusive and R is selected from the group consisting of chlorine, bromine, amino, nitro, hydrogen, hydroxy, lower alkyl, and lower alkoxy, R' is lower alkyl having not more than 4 carbon atoms, together with the acid salts of these compounds.

The new compounds of Formula I quite unexpectedly possess pharmacological properties which make them suitable as central nervous system agents. These new compounds are particularly adapted for producing stimulation and energizing effects in both animals and humans. Due to their somewhat basic character, these compounds are preferably used in the salt form, such as for example the hydrochloride, hydrobromide, phosphate, citrate, acetate, benzoate or the like. Other acid salts that are pharmaceutically acceptable may also be used.

When utilizing these new compounds for the purposes described, it may be desirable to combine the compound with suitable solvents, carriers, diluents, flavoring agents and the like as necessary. In such forms these new compounds may be administered in small amounts such as in tablet form, orally or in other suitable ways.

In preparing these compounds according to the method of the present invention, a suitable polymethylene indole sodium or potassium and a solvent such as pyridine together with a vinylpyridine. The reactant mixture is refluxed for a period of from 2 to 10 hours at a reflux temperature dependent on the particular solvent used and the boiling points of the selected reactants. After the reaction has been completed the mixture is cooled and concentrated under reduced pressure. After substantially complete removal of the solvent, the mixture is again cooled. The resulting oil may be removed with ether or an equivalent material. Alternatively, the oil may be washed with water or it may be converted to the salt as by treating with ethanolic hydrogen chloride or an equivalent acid according to conventional practice.

In preparing the new compounds (I) of this invention, indoles of the following general structure are preferred:

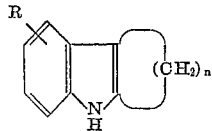

in which $n$ has a value of from 5 to 13 and R is selected from the group consisting of chlorine, bromine, nitro, hydrogen, lower alkyl, such as methyl, ethyl, propyl, butyl and lower alkoxy such as methoxy, ethoxy, propoxy and butoxy. Typical of the indoles which are suitable for the purposes of the present invention are the following:

2:3 pentamethyleneindole,
2:3 hexamethyleneindole,
2:3 heptamethyleneindole,
2:3 octamethyleneindole,
2:3 decamethyleneindole,
2:3 dodecamethyleneindole,
5-methyl-2:3 pentamethyleneindole,
5-methoxy-2:3 pentamethyleneindole,
6-ethyl-2:3 hexamethyleneindole,
5-nitro-2:3 heptamethyleneindole,
5-chloro-2:3 octamethyleneindole,
5-bromo-2:3 hexamethyleneindole,
6-bromo-2:3 pentamethyleneindole,
5-ethoxy-2:3 hexamethyleneindole,
7-nitro-2:3 tridecamethyleneindole,
6-butyl-2:3 heptamethyleneindole,
5-nitro-2:3 octamethyleneindole,
4-chloro-2:3 decamethyleneindole,
5-phenyl-2:3 pentamethyleneindole,
6-benzyl-2:3 hexamethyleneindole,
5-isobutyl-2:3 pentamethyleneindole,
5-2-ethylhexyl-2:3 heptamethyleneindole,
and 7-butoxy-2:3 tridecamethyleneindole.

In preparing the new structures of the type (I) above it is necessary as has been suggested that the selected indole be condensed with a vinyl pyridine. Alternatively a haloalky pyridine can be reacted with a suitable indole which has been converted to its alkali salt by use of alkali metal hydride in a solvent such as dimethylformamide.

This position of the vinyl group on the starting pyridine will of course determine the ultimate relationship of the pyridyl ring to the indole in the final reaction product (I). The recovery of the final product is accomplished after removal of excess solvent by extraction with solvent or water washing followed by decanting. As has been previously suggested, the salt may be then prepared in a conventional manner by reaction with an alcohol or ethereal solution of an anhydrous acid such as hydrochloric or an organic acid such as maleic or fumaric or the like.

Compounds of Formula I wherein R is amino are obtainable by catalytic hydrogenation of the pyridylethylated compounds where R is a nitro group. Compounds of Formula I wherein R is hydroxy are obtainable by treating the pyridylethylated compound wherein R is methoxy with pyridine hydrochloride.

Reference to the representative examples which follow will provide a better understanding of the new compounds of the present invention and the manner in which the same are prepared:

Example I

Twenty g. of 2:3-hexamethyleneindole, 10.5 g. of 4-vinyl-pyridine, and 0.2 g. of potassium metal in 100 ml. of dry pyridine is heated under reflux for 3 hours, cooled, and 10 ml. ethanol added. The mixture is then concentrated under reduced pressure to about ½ volume and poured into 200 ml. of cold water. An oil separates. The oil is washed by trituration with water and the water decanted off with the residue being crystallized from ethanol water. There is obtained 12.5 g. of 1-(2-[4-pyridyl]ethyl) - 2:3 - hexamethyleneindole, M.P. (from 80% aq. ethanol) 87–88° C.

*Analysis.*—Calc.: C, 82.90; H, 7.95 (for $C_{21}H_{24}N_2$).
Found: C, 83.19; H, 8.16.

The hydrochloride salt is prepared and crystallized from ether-ethanol, M.P. 224–225° C.

*Analysis.*—Calc.: Cl, 10.38; N, 8.23 (for $C_{21}H_{15}ClN_2$).
Found: Cl, 10.32; N, 8.01.

Example II

Following the method of Example I, 5-chloro-2:3-pentamethyleneindole is reacted with 4-vinylpyridine under reflux to produce 1-(2-[4-pyridyl]ethyl)-5-chloro-2:3-pentamethyleneindole.

Example III

According to the method of Example I, 1-(2-[pyridyl]ethyl)-2:3-tridecamethyleneindole is prepared by reacting 4-vinylpyridine with 2:3-tridecamethyleneindole. The latter compound can be prepared according to the method described in J. Chem. Soc, pg. 2882 (1949).

Example IV

Following the method described in Example I, 5-methoxy-2:3-pentamethyleneindole and 2-vinylpyridine are reacted to produce 1-(2-[2-pyridyl]ethyl)-5-methoxy-2:3-pentamethyleneindole.

Example V

Starting with the product of Example IV above, 1-(2-[2-pyridyl]ethyl)-5-methoxy-2:3-pentamethyleneindole is heated with 3 parts by weight of pyridine hydrochloride for a period of from 2 to 4 hours to produce 1-(2-[2-pyridyl]ethyl)-5-hydroxy-2:3-pentamethyleneindole.

Example VI

According to the method of the foregoing examples, 5-nitro-2:3-pentamethyleneindole and 4-vinylpyridine are reacted by refluxing in the presence of an alkali metal and a solvent to produce 1-(2-[4-pyridyl]ethyl)-5-nitro-2:3-pentamethyleneindole. The latter compound on catalytic hydrogenation in the presence of platinum or palladium is converted to 1-(2-[4-pyridyl]ethyl)-5-amino-2:3-pentamethyleneindole.

Example VII

A solution of 18.5 g. (0.09 mole) of 2:3-hexamethyleneindole, 10.5 g. 2-vinylpyridine and 0.2 g. potassium metal in 100 ml. pyridine is heated under reflux for 3 hours. The pyridine is removed by vacuum distillation and the residue slurried with 100 ml. of water three times (decanting off aqueous supernatant each time). The oil resulting is taken into ether and the solution dried over sodium sulfate. After filtration, the solution is treated with ethanolic hydrogen chloride until acid. The precipitated hydrochloride of 1-(2-[2-pyridyl]ethyl)-2:3-hexamethyleneindole is collected and recrystallized from ethanol-ether, M.P. 176–177° C. Yield 11.5 g.

*Analysis.*—Calc.: Cl, 10.38; N, 8.23 (for $C_{21}H_{25}ClN_2$). Found: Cl, 10.50; N, 8.12.

Example VIII

Following the method of Example I, 2:3-pentamethyleneindole is reacted with 2-methyl-4-vinylpyridine under reflux to produce 1-(2-[2-methyl-4-pyridyl]ethyl)-2:3-pentamethyleneindole.

Example IX

Following the method of Example I, 2:3-pentamethyleneindole is reacted with 4-methyl-2-vinylpyridine under reflux to produce 1-(2-[4-methyl-2-pyridyl]ethyl)-2:3-pentamethyleneindole.

Example X

Following the method of Example I, 5-methyl-2:3-pentamethyleneindole is reacted with 4-vinylpyridine under reflux to produce 1-(2-[pyridyl]ethyl)-5-methyl-2:3-pentamethyleneindole.

In the foregoing examples, specific compounds of the present invention have been prepared, representative of the compounds comprehended by the general structure (I) and considered within the scope of the present invention. It is to be understood that preparation and identification of these specific compounds should in no way be considered a limitation on the scope of this invention. The latter is to be limited only by the claims appended hereto in which the invention claimed is:

1. A compound of the formula

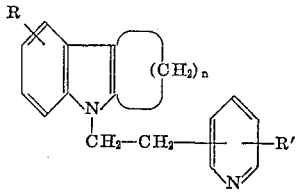

wherein $n$ is an integer from 5 to 13 inclusive and R is selected from the group consisting of chlorine, bromine, hydroxy, amino, nitro, lower alkyl, lower alkoxy and hydrogen and R' is lower alkyl having not more than 4 carbon atoms.

2. 1-(2-[2-pyridyl]ethyl)-2:3-hexamethyleneindole.
3. 1-(2-[4-pyridyl]ethyl)-2:3-hexamethyleneindole.
4. 1-(2-[4-pyridyl]ethyl)-5-chloro-2:3-pentamethyleneindole.
5. 1-(2-[4-pyridyl]ethyl)-2:3-tridecamethyleneindole.
6. 1-(2-[pyridyl]ethyl)-5-methoxy-2:3-pentamethyleneindole.
7. 1-(2-[4-pyridyl]ethyl)-5-hydroxy-2:3-pentamethyleneindole.
8. 1-(2-[4-methyl-2-pyridyl]ethyl)-2:3-pentamethyleneindole.
9. 1-(2-[4-pyridyl]ethyl)-5-amino-2:3-pentamethyleneindole.
10. The hydrochloride salt of 1-(2-[4-pyridyl]ethyl)-5-nitro-2:3-pentamethyleneindole.

References Cited in the file of this patent

UNITED STATES PATENTS 2,922,786    Sam _____ Jan. 26, 1960

FOREIGN PATENTS 556,746    Belgium _____ May 15, 1957

UNITED STATES PATENT OFFICE
CERTIFICATE OF CORRECTION

Patent No. 3,154,556                                        October 27, 1964

Meier E. Freed et al.

It is hereby certified that error appears in the above numbered patent requiring correction and that the said Letters Patent should read as corrected below.

Column 1, line 46, after "indole" insert -- is heated in the presence of an alkali metal such as --; column 2, line 31, after "alkali" insert -- metal --; line 71, for "$H_{15}$" read -- $H_{25}$ --; column 3, lines 8 and 9, and column 4, line 10, for "-[pyridyl]ethyl)-", each occurrence, read -- -[4-pyridyl]ethyl)- --; column 4, lines 36, 37 and 46, for "-2:3-", each occurrence, read -- -2:3 --.

Signed and sealed this 3rd day of August 1965.

(SEAL)
Attest:

ERNEST W. SWIDER                                  EDWARD J. BRENNER
Attesting Officer                                      Commissioner of Patents